US008088354B2

(12) United States Patent
Laheij et al.

(10) Patent No.: US 8,088,354 B2
(45) Date of Patent: Jan. 3, 2012

(54) HYDROTHERMAL PROCESS FOR THE PREPARATION OF QUASI-CRYSTALLINE BOEHMITE

(75) Inventors: Erik Jeroen Laheij, Amstelveen (NL); Paul O'Connor, Hoevelaken (NL); Dennis Stamires, Newport Beach, CA (US); Edisson Morgado, Jr., Rio de Janerio (BR); Marco Antonio Santos de Abreu, Rio de Janerio (BR); Márcio Fernandes, Rio de Janerio (BR); Michael Brady, Studio City, CA (US)

(73) Assignee: Albemarle Netherlands B.V., Amsterdam (NL)

( * ) Notice: Subject to any disclaimer, the term of this patent is extended or adjusted under 35 U.S.C. 154(b) by 1226 days.

(21) Appl. No.: 10/579,595

(22) PCT Filed: Nov. 19, 2004

(86) PCT No.: PCT/EP2004/013226
§ 371 (c)(1),
(2), (4) Date: May 21, 2007

(87) PCT Pub. No.: WO2005/051845
PCT Pub. Date: Jun. 9, 2005

(65) Prior Publication Data
US 2007/0274903 A1 Nov. 29, 2007

(30) Foreign Application Priority Data
Dec. 19, 2003 (EP) .................................... 03078996

(51) Int. Cl.
*C01F 7/02* (2006.01)

(52) U.S. Cl. ....................................... 423/625; 423/631
(58) Field of Classification Search ........... 423/625–631
See application file for complete search history.

(56) References Cited

U.S. PATENT DOCUMENTS

| 5,194,243 | A | 3/1993 | Pearson et al. |
| 2002/0111263 | A1 | 8/2002 | Stamires et al. |
| 2003/0087750 | A1* | 5/2003 | Stamires et al. ............... 501/141 |
| 2006/0096891 | A1* | 5/2006 | Stamires et al. ............... 208/122 |

FOREIGN PATENT DOCUMENTS

| EP | 0 505 896 B1 | 10/1996 |
| WO | WO 01/12551 A2 | 2/2001 |
| WO | WO 01/12553 A1 | 2/2001 |
| WO | WO 01/12554 A1 | 2/2001 |

* cited by examiner

*Primary Examiner* — Edward Johnson
(74) *Attorney, Agent, or Firm* — James A. Jubinsky

(57) ABSTRACT

Process for the preparation of quasi-crystalline boehmite comprising the steps of: (a) preparing an aqueous precursor mixture comprising a water-insoluble aluminum source; (b) decreasing the pH of the precursor mixture of step (a) by at least 2 units; (c) increasing the pH of the mixture of step (b) by at least 2 units, and (d) aging the mixture of step (c) under hydrothermal conditions to form a quasi-crystalline boehmite. This process provides for the hydrothermal preparation of quasi-crystalline boehmites with high peptizability. The invention therefore further relates to quasi-crystalline boehmites with a high peptizability, measured as the Z-average submicron particle size. This Z-average submicron particle size preferably is less than 500 nm, more preferably less than 300 nm, even more preferably less than 200 nm, and most preferably less than 100 nm.

16 Claims, No Drawings

HYDROTHERMAL PROCESS FOR THE PREPARATION OF QUASI-CRYSTALLINE BOEHMITE

Boehmite, also called alpha-alumina monohydrate, and its dehydrated and sintered forms are some of the most extensively used aluminium oxide-hydroxide materials. These materials are used as ceramics, abrasive materials, fire-retardants, adsorbents, catalysts, fillers in composites, etc. Also, a major portion of the commercial boehmite aluminas is used in catalytic applications such as refinery catalysts, catalysts for hydroprocessing hydrocarbon feeds, reforming catalysts, pollution control catalysts, cracking catalysts, and catalysts for the production of ethylene oxide, the production of methanol, the conversion of chlorofluorohydrocarbons (CFCs), and the reduction of nitrogen oxide from exhaust gases of gas turbines.

The term "hydroprocessing" in this context encompasses all processes in which a hydrocarbon feed is reacted with hydrogen at elevated temperature and elevated pressure. These processes include hydrodesulfurization, hydrodenitrogenation, hydrodemetallization, hydrodearomatization, hydroisomerization, hydrodewaxing, (mild) hydrocracking.

The term "boehmite" is used in the industry to describe alumina hydrates which exhibit X-ray diffraction (XRD) patterns close to that of aluminium oxide-hydroxide [AlO(OH)]. Further, the term boehmite is generally used to describe a wide range of alumina hydrates which contain different amounts of water of hydration, have different surface areas, pore volumes, specific densities, and exhibit different thermal characteristics upon thermal treatment. Yet their XRD patterns; although they exhibit the characteristic boehmite [AlO(OH)] peaks, usually vary in their widths and can also shift in their location. The sharpness of the XRD peaks and their location have been used to indicate the degree of crystallinity, crystal size, and amount of imperfections.

Broadly speaking, there are two categories of boehmite aluminas: quasi-crystalline boehmites (QCBs) and micro-crystalline boehmites (MCBs).

In the state of the art, quasi-crystalline boehmites are also referred to as pseudo-boehmites and gelatinous boehmites. Usually these QCBs have higher surface areas, larger pore volumes, and lower specific densities than MCBs. They disperse easily in water or acids, have smaller crystal sizes than MCBs, contain a larger number of water molecules of hydration, and are usually able to be peptized in an acidic medium. The extent of hydration of the QCB can have a wide range of values, for example from about 1.4 up to about 2 moles of water per mole of Al, intercalated usually orderly or otherwise between the octahedral layers.

DTG (differential thermographimetry) indicates that compared to MCBs, the major amount of water is released from QCBs at a much lower temperature.

The XRD patterns of QCBs show quite broad peaks and their half-widths (i.e. the widths of the peaks at half-maximum intensity) are indicative of the crystal sizes as well as degree of crystal perfection.

Some typical commercially available QCBs are PuralSB®, Catapal®, and Versal® products.

Microcrystalline boehmites are distinguished from the QCBs by their high degree of crystallinity, relatively large crystal size, very low surface areas, and high densities. Contrary to the QCBs, the MCBs show XRD patterns with higher peak intensities and very narrow half-widths. This is due to their relatively small number of intercalated water molecules, large crystal sizes, higher degree of crystallization of the bulk material, and smaller amount of crystal imperfections. Typically, the number of intercalated water molecules can vary in the range from about 1 up to about 1.4 per mole of Al.

A typical commercially available MCB is Sasol's P-200®.

MCBs and QCBs are characterized by powder-X-ray reflections (PXRD). The ICDD contains entries for boehmite and confirms that reflections corresponding to the (020), (021), and (041) planes would be present. For copper radiation, such reflections would appear at 14, 28, and 38 degrees 2-theta. The exact position of the reflections depends on the extent of crystallinity and the amount of water intercalated: as the amount of intercalated water increases, the (020) reflection moves to lower values, corresponding to greater d-spacings. Nevertheless, lines close to the above positions would be indicative of the presence of one or more types of boehmite phases.

For the purpose of this specification we define quasi-crystalline boehmites as having a (020) reflection with a full width at half-height (FWHH) of 1.5° or greater than 1.5° 2θ. Boehmites having a (020) FWHH smaller than 1.5° 2θ are considered micro-crystalline boehmites.

It is noted that in the specification all PXRD data derive from measurements with Cu K-α radiation.

Overall, the basic characteristic differences between QCBs and MCBs involve, variations in the following: 3-dimensional lattice order, sizes of the crystallites, amount of water intercalated between the octahedral layers, and degree of crystal imperfections.

Boehmites are most commonly manufactured via processes involving neutralization of aluminium salts by alkalines, acidification of aluminate salts, hydrolysis of aluminium alkoxides, reaction of aluminium metal (amalgamated) with water and rehydration of amorphous rho-alumina obtained by flash-calcining aluminium trihydrate.

The pH and the temperature of the suspension during aging are critical features in the preparation of boehmites. The crystallization rate increases with pH and temperature. The higher the pH and temperature, the more MCB is formed.

The rate of formation of boehmite increases with the reaction temperature. Hence, the reaction rate under hydrothermal conditions (temperature above 100° C.) is higher than under atmospheric conditions (temperature below 100° C.). Unfortunately, however, hydrothermal conditions generally favour the formation of MCB instead of QCB.

The same effect can be seen with the pH: a high pH favours the reaction rate, but at the same time facilitates MCB formation.

It is therefore an object of the present invention to provide a hydrothermal process for the preparation of QCBs which favours QCB formation over MCB formation.

Another object of the present invention is to provide a hydrothermal process for the preparation of highly peptizable QCBs.

A boehmite is referred to as peptizable when if contacted with a peptizing agent such as a monoprotic acid (e.g. $HNO_3$ and HCl solutions), it is easily disaggregated into a metastable colloidal dispersion or into a homogeneous gel. Alumina trihydrates are known not to be peptizable. Among hydrated aluminas only monohydrates are capable of being peptized. For instance, QCBs derived from the hydrolysis of aluminium alkoxides are fairly peptizable. However, QCBs derived from the neutralization of aluminium salts at high temperatures do not easily peptize. Neither do MCBs derived from conventional hydrothermal conversion of trihydrates. The present invention now provides a process for the hydrothermal preparation of peptizable QCBs.

The present invention provides such a process. This process comprises the following steps:

a) preparing an aqueous precursor mixture comprising a water-insoluble aluminium source,
b) decreasing the pH of the precursor mixture by at least 2 units,
c) increasing the pH of the mixture of step b) by at least 2 units, and
d) aging the mixture of step c) under hydrothermal conditions to form a quasi-crystalline boehmite.

Without wishing to be bound by theory, it is believed that decreasing the pH in step b) will cause part of the water-insoluble aluminium source to dissolve and/or hydroxylate, which favours the formation of nuclei. By subsequently increasing the pH in step c), the crystallization rate of boehmite increases. If large amounts of nuclei are formed, the formation of boehmites with small crystallites is favoured over the formation of boehmites with larger crystallites. Hence, QCB formation is favoured over MCB formation.

Alumina Source

Suitable water-insoluble aluminium sources for use in the process according to the present invention include aluminium trihydrate or its thermally treated form, aluminium sols, gels, amorphous alumina, and mixtures thereof. Preferably, aluminium trihydrate or its thermally treated form is used.

In the present invention aluminium trihydrate includes crystalline aluminium trihydrate (ATH), for example gibbsites provided by Reynolds Aluminium Company RH-20® or JM Huber Micral® grades. Also BOC (Bauxite Ore Concentrate), bayerite, and norstrandite. BOC is the cheapest aluminium source. The alumina trihydrate is preferred to have a particle size ranging from 1 to 150 μm, more preferably smaller than 20 μm.

Thermally treated aluminium trihydrate includes calcined aluminium trihydrate and flash-calcined aluminium trihydrate. Calcined aluminium trihydrate is readily obtained by thermally treating aluminium trihydrate (e.g. gibbsite) at a temperature above 100° C., preferably ranging from 100 to 800° C., for a period of 15 minutes to 24 hours. In any event, the calcination temperature and time for obtaining calcined aluminium trihydrate should be sufficient to cause a measurable increase in the surface area compared to the surface area of the gibbsite as produced by the Bayer process, which is generally between 30 and 50 $m^2/g$.

Flash-calcined aluminium trihydrate is obtained by treating aluminium trihydrate at temperatures between 800-1000° C. for very short periods of time in special industrial equipment; as is described in U.S. Pat. No. 4,051,072 and U.S. Pat. No. 3,222,129.

Step a)

In the process according to the invention an aqueous precursor mixture comprising one or more of the above aluminium sources is prepared.

Especially when aluminium trihydrate is used as the aluminium source, seeds are desirably added to the precursor mixture. Suitable seeds are the known seeds to make boehmite, such as commercially available boehmites (Catapal®, Versal®, P-200®, etc.), amorphous seeds, milled boehmite seeds, boehmite prepared from sodium aluminate solutions, and thermally treated aluminium trihydrate (e.g. flash-calcined aluminium trihydrate) seeds.

Especially preferred are pseudoboehmite seeds prepared by neutralizing sodium aluminate with acids or aluminium salts, followed by washing and optionally aging.

The process can be operated in a self-seeding mode, where part of the boehmite formed is chemically or mechanically treated to obtain small boehmite particles, which are then used as seed.

Although an aluminium compound like aluminium chlorohydrol or aluminium salts such as aluminium nitrate, aluminium chloride, or sodium aluminate may also be present in the precursor mixture, it is preferred that the precursor mixture does not contain such compound or salts.

Step b)

Step b) of the process involves decreasing the pH of the precursor mixture prepared in step a) by at least 2 units. Preferably, the pH is decreased by at least 3, more preferably at least 4, and most preferably at least 5 units.

The resulting pH is preferably less than 7, more preferably less than 5, more preferably less than 4, even more preferably less than 3, and most preferably 2 or less. The pH is preferably at least 1.

The pH can be decreased by any compound that is able to decrease the pH of the aqueous precursor mixture. Examples of these compounds are nitric acid, sulfuric acid, hydrochloric acid, formic acid, acetic acid, polysilicic acid, oxalic acid, phosphoric acid, glycolic acid, ammonium nitrate, cerium nitrate, aluminium nitrate, aluminium sulfate, and mixtures thereof.

Brønsted acids like nitric acid, sulfuric acid, hydrochloric acid, formic acid, acetic acid, and oxalic acid are preferred. Monoprotic acids, like nitric acid, are the most preferred.

The amount of acid introduced into the precursor mixture in order to decrease the pH to the desired level preferably is 0.005 to 5.0, more preferably 0.01 to 1.5, and most preferably 0.05 to 2.0 times the amount of Al present in the precursor mixture (calculated in molar equivalents).

If pseudoboehmite seeds are present in the precursor mixture, the pH decrease may cause peptization of the seeds.

During step b), the temperature of the precursor mixture preferably is between 20 and 100° C., more preferably between 20 and 80° C.

Step c)

The next step requires a pH increase by at least two units, preferably at least 4, more preferably at least 6 pH units. The resulting pH preferably is at least 4, more preferably at least 6, more preferably still at least 8, even more preferably at least 10, and most preferably in the range 11-12.

The pH can be increased by any compound that is able to increase the pH of the aqueous precursor mixture. Examples of these compounds are sodium hydroxide, potassium hydroxide, ammonium hydroxide, ammonium hydroxycarbonate, sodium aluminate, magnesium oxide, and mixtures thereof. Sodium hydroxide, potassium hydroxide, ammonium hydroxide are the preferred bases for increasing the pH.

The amount of base introduced into the precursor mixture in order to increase the pH preferably is 0.005 to 5.0, more preferably 0.01 to 1.5, and most preferably 0.05 to 2.0 times the amount of Al present in the precursor mixture (calculated in molar equivalents).

After decreasing the pH in step b), it is preferred to wait for about 1-60 minutes before increasing it in step c). During this period the mixture can be mixed, milled and/or pre-aged.

During step c), the temperature of the precursor mixture preferably is between 20 and 100° C., more preferably between 20 and 80° C.

The temperatures applied during steps b) and c) may be the same. However, it is also possible to conduct each step at a different temperature.

Step d)

The precursor mixture is aged under hydrothermal conditions, i.e. a temperature above the boiling point of the slurry and at increased pressure. The temperature therefore is above 100° C. The aging temperature preferably is 110-250° C., more preferably 150-200° C. The pressure preferably is autogenous.

Aging is generally conducted for 5 minutes to 48 hours, preferably 20 minutes to 8 hours, more preferably 20 minutes to 2 hours.

If desired, one or more additives may be added to the precursor mixture, either before or during aging. Examples of such additives are compounds comprising rare earth metals (for example La and Ce), Si (e.g. silicates), P, B, Group VI metals, Group VIII metals, alkaline earth metals (for instance Mg, Ca, and Ba) and/or transition metals (for example Mn, Fe, Co, Ti, Zr, Cu, Ni, Ru, Zn, Mo, W, V, Sn), swellable clays like smectites and their ion-exchanged forms. Examples of suitable smectites are montmorillonite (e.g. bentonite), beidellite, nontronite, hectorite (e.g. Laponite®), saponite, sauconite, and modified forms thereof. The addition of clays favours the formation of QCB over MCB.

Also organic additives can be added, such as polymers, surfactants, carbon, carbohydrates (sugars, starches), and other pore regulating agents.

The additives can be added to the precursor mixture as such and/or as already present in the water-insoluble aluminium source or the optional seed, by using doped aluminium source or a doped seed. Some additives can also function as seed.

Furthermore, it is possible to mill the precursor mixture before and/or during aging. It is also possible to mill the water-insoluble aluminium source before its addition to the precursor mixture. In this specification the term "milling" is defined as any method that results in reduction of the particle size. Such a particle size reduction can at the same time result in the formation of reactive surfaces and/or heating of the particles. Instruments that can be used for milling include ball mills, high-shear mixers, colloid mixers, and electrical transducers that can introduce ultrasound waves into a slurry. Low-shear mixing, i.e. stirring that is performed essentially to keep the ingredients in suspension, is not regarded as milling.

The process is preferably conducted in a continuous fashion. More preferably, this is done in an apparatus comprising two or more conversion vessels.

For example, the precursor mixture is prepared in a feed preparation vessel, after which the mixture is continuously pumped through two or more conversion vessels. The acid can be added to the mixture in the feed preparation vessel or in one of the conversion vessels. Base is added in a subsequent conversion vessel.

Additives, if so desired, may be added to the mixture in any of the conversion vessels.

Each of the vessels can be adjusted to its own desirable temperature.

The total average residence time in all vessels together preferably is between 20 and 120 minutes.

The QCB obtained by the process of the invention can be filtered and washed to remove contaminants, such as sodium and sulfate.

If so desired, the QCB obtained may be shaped into shaped quasi-crystalline boehmite bodies, optionally with the help of binders and/or fillers. In order to obtain shaped boehmite bodies it is also possible to use a shaped water-insoluble aluminium source.

Suitable shaping methods include spray-drying, pelletizing, granulating, extruding (optionally combined with kneading), beading, or any other conventional shaping method used in the catalyst and absorbent fields or combinations thereof.

In the case of beading or kneading it is also possible to combine the aging and shaping steps and to add additives during the combined shaping and aging step.

The amount of liquid present in the mixture to be shaped should be adapted to the specific shaping step to be conducted. It might be advisable to partially remove the liquid used in the precursor mixture and/or to add additional or another liquid and/or to change the pH of the aged mixture to make the mixture gellable and thus suitable for shaping. Additives commonly used in the different shaping methods, e.g. extrusion additives, may be added to the mixture.

The QCB obtained by the process preferably has a FWHH of the (020) reflection of between 1.5 and 2° 2θ, more preferably between 1.6 and 1.85° 2θ.

The Z-average submicron particle size of the QCB obtained by the process preferably is less than 500 nm, more preferably less than 300 nm, even more preferably less than 200 nm, and most preferably less than 100 nm. This particle size is a measure of the peptizability of the QCB: the smaller this size, the more peptizable the QCB.

The Z-average submicron particle size is measured diluting the reaction mixture after the aging step d) to 1% solids and acidifying this mixture to pH=2 with nitric acid under agitation, after which the mixture is agitated for another 15 minutes. The Z-average submicron particle size of the particles in this mixture is then measured with quasi-electron light scattering, for instance by using a Zetasizer-1000HS instrument.

The QCB prepared according to the process, of the invention is extremely suitable as component (e.g. matrix or support) or starting material for catalyst compositions or catalyst additives. To this end the boehmite is combined with, e.g., binders, fillers (e.g. clay such as kaolin, titanium oxide, zirconia, silica, silica-alumina, bentonite, etcetera), catalytically active material such as molecular sieves (e.g. ZSM-5, zeolite Y, USY REY, and RE-USY zeolite, zeolite beta, mordenite, MCM-type materials), and any other catalyst components (e.g. pore regulating additives) which are commonly used in catalyst compositions. Furthermore, the boehmite may be mixed with other metal oxides or hydroxides, binders, fillers, extenders, activators, pore regulating additives, etc., to produce absorbents, ceramics, substrates, fire retardant, or carriers.

The so-prepared boehmite can suitably be used in refinery catalysts, catalysts for hydroprocessing (hydrodesulfurization, hydrodenitrogenation, hydrodemetallization) hydrocarbon feeds, reforming catalysts, FCC catalysts or additives, Fisher-Tropsch catalysts, hydrogenation catalysts, dehydrogenation catalysts, catalysts for the production of ethylene oxide, catalysts for the production of methanol, catalysts for the conversion of chlorofluorohydrocarbons (CFCs), etc., optionally after calcination.

EXAMPLES

Examples 1-4 and Comparative Example 5

Reaction mixtures were prepared comprising 80 wt % gibbsite (Alcoa C-30) and 20 wt % pseudoboehmite seeds (calculated as $Al_2O_3$ based on dry solids content). These seeds were obtained by neutralization of sodium aluminate with aluminium sulfate, washing the precipitate to remove sulfate, and finally aging the precipitate at 95° C. under atmospheric pressure. The pH of the reaction mixtures was about 8.

The pH of the reaction mixture was decreased with nitric acid to the value, indicated in Table 1. Then, the pH was increased to 12.5 by the addition of caustic soda. The resulting mixtures were aged at 170° C. for 20 minutes.

In Comparative Example 5, the pH of the mixture was directly increased to 12.5, without prior acidification.

Table 1 indicates the full width at half height (FWHH) of the (020) reflection of the different boehmites formed. It shows that the process of the invention produced quasi-crystalline boehmite (FWHH≧1.5° 2θ), while the comparative example produced micro-crystalline boehmite (FWHH<1.5° 2θ).

Table 1 also indicates the average particle size, as measured by quasi-electronic light scattering (QELS), which is a measure of the peptizability of the boehmite. This test was done as follows: after diluting the reaction mixture after the aging step to 1% solids and acidifying this mixture to pH=2 with nitric acid under agitation, the mixture was agitated for another 15 minutes. The Z-average submicron particle size of the particles in this mixture were then measured with a Zetasizer-1000HS instrument. The smaller this particle size, the more peptizable the boehmite is.

As shown in Table 1, the peptizability of the boehmite prepared according to the process of the invention is higher than the peptizability of the boehmite according to Comparative Example 5.

TABLE 1

| Example | pH after HNO$_3$ addition | FWHH * (020) reflection (°2θ) | crystal size (nm) | QELS (nm) |
|---|---|---|---|---|
| 1 | 2 | 1.75 | 7.2 | 96 |
| 2 | 3 | 1.75 | 7.2 | 162 |
| 3 | 4 | 1.80 | 7.0 | 104 |
| 4 | 6 | 1.65 | 7.4 | 233 |
| 5 | no HNO$_3$ addition | 1.20 | 9.1 | 673 |

* FWHH—Full width at half-height

Comparative Example 6

Gibbsite (Huber Micral 916) [16.4 g] and flash-calcined gibbsite (Alcoa Cp-3) [4.79 g] were slurried in deionized water. The solids content of the resulting precursor mixture was about 12 wt %. After the slurry was high-shear mixed, the final pH was 9.5. The resulting slurry was homogenized and aged at 185° C. for two hours in an autoclave at autogenous pressure. Subsequently, the slurry was filtered, washed, and dried at 120° C. X-ray diffraction analysis indicated the product consisted of MCB-type alumina.

Example 7

Gibbsite (Huber Micral 916) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 2.70 g of a 49.0% sulfuric acid solution were added under high-shear mixing. The pH of the resulting slurry was 1.77. Subsequently, 4.70 g of a 29.9% sodium hydroxide solution were added until the pH was 9.6. The resulting slurry was homogenized and aged at 185° C. for two hours in an autoclave at autogenous pressure. Subsequently, the slurry was filtered, washed with dilute ammonium hydroxide solution, and dried at 120° C. X-ray diffraction analysis indicated the product consisted of QCB-type alumina.

Example 8

Flash-calcined gibbsite (Alcoa Cp-3) [15.9 g] was slurried in deionized water. The solids content of the resulting precursor mixture was about 12 wt % and the pH was about 9.7. To this mixture, 6.00 g of a 49.0 wt % sulfuric acid solution were added under high-shear mixing. The pH of the resulting slurry was 1.19. Subsequently, 4.20 g of a 29.9 wt % ammonium hydroxide solution were added until the pH was 4.48. The resulting slurry was homogenized and aged at 165° C. for two hours in an autoclave at autogenous pressure. Subsequently, the slurry was filtered, washed with dilute ammonium hydroxide solution, and dried at 120° C. X-ray diffraction analysis indicated the product consisted of QCB-type alumina with a FWHH of 2.8° 2θ.

Example 9

Flash-calcined gibbsite (Alcoa Cp-3) [15.9 g] was slurried in deionized water. The solids content of the resulting precursor mixture was about 12 wt % and the pH was about 9.7. To this mixture, 4.50 g of a 49.0% sulfuric acid solution were added under high-shear mixing. The pH of the resulting slurry was 1.12. Subsequently, 38.9 g of a 3.85% sodium hydroxide solution were added until the pH was 4.48. The resulting slurry was homogenized and aged at 165° C. for two hours in an autoclave at autogenous pressure. Subsequently, the slurry was filtered, washed with dilute ammonium hydroxide solution, and dried at 120° C. X-ray diffraction analysis indicated the product consisted of QCB-type alumina with a FWHH of 2.4° 2θ.

Comparative Example 10

Flash-calcined gibbsite (Alcoa Cp-3) [15.9 g] was slurried in deionized water. The solids content of the resulting precursor mixture was about 12 wt % and the pH was about 9.7. To this mixture, 0.20 g of a 35.0% nitric acid solution was added under high-shear mixing. The pH of the resulting slurry was 6.5. The resulting slurry was homogenized and aged at 165° C. for two hours. Subsequently, the slurry was filtered, washed, and dried at 120° C. X-ray diffraction analysis indicated the product consisted of MCB-like type alumina with a FWHH of 1.4° 2θ.

Example 11

Flash-calcined gibbsite (Alcoa Cp-3) [15.9 g] was slurried in deionized water. The solids content of the resulting precursor mixture was about 12 wt % and the pH was about 9.7. To this mixture, 11.3 g of a 35.0% nitric acid solution were added under high-shear mixing. The pH of the resulting slurry was 0.97. Subsequently, 5.00 g of a 29.9% ammonium hydroxide solution were added until the pH was 5.50. The resulting slurry was homogenized and aged at 165° C. for two hours. Subsequently, the slurry was filtered, washed, and dried at 120° C. X-ray diffraction analysis indicated the product consisted of QCB-type alumina with a FWHH of 2.5° 2θ.

Example 12

Flash-calcined gibbsite (Alcoa Cp-3) [15.9 g] was slurried in deionized water The solids content of the resulting precursor mixture was about 12 wt % and the pH was about 9.7. To this mixture, 62.00 g of a 50.0% acetic acid solution were added under high-shear mixing. The pH of the resulting slurry was 2.52. Subsequently, 23.90 g of a 29.9% ammonium hydroxide solution were added, until the pH was 4.50. The resulting slurry was homogenized and aged at 165° C. for two hours. Subsequently, the slurry was filtered, washed, and dried at 120° C. X-ray diffraction analysis indicated the product consisted of QCB-type alumina.

Example 13

Flash-calcined gibbsite (Alcoa Cp-3) [13.5 g] and Catapal A [3.13 g] were slurried in deionized water in a weight ratio of 85 to 15. The solids content of the resulting precursor mixture was about 12 wt % and the pH was about 9.5. To this mixture, 7.00 g of a 35.0% nitric acid solution were added under high-shear mixing. The pH of the resulting slurry was 1.20. After 4 hours at 65° C., the slurry pH increased to 3.5. Subsequently, 0.35 g of a 29.9% ammonium hydroxide solution was added until the pH was 5.00. The resulting slurry was homogenized and aged at 165° C. for two hours. Subsequently, the slurry was filtered, washed, and dried at 120° C. X-ray diffraction analysis indicated the product consisted of QCB-type alumina with a FWHH of 2.6° 2θ.

Example 14

Flash-calcined gibbsite (Alcoa Cp-3) [13.5 g] and Catapal A [3.13 g] were slurried in deionized water. The solids content of the resulting precursor mixture was about 12 wt % and the pH was about 9.5. To this mixture, 7.00 g of a 35.0% nitric acid solution were added under high-shear-mixing. The pH of the resulting slurry was 1.20. Subsequently, 3.90 g of a 299% ammonium hydroxide solution were added until the pH was 5.00. The resulting slurry was homogenized and aged at 165° C. for two hours in an autoclave at autogenous pressure. Subsequently, the slurry was filtered, washed, and dried at 120° C. X-ray diffraction analysis indicated the product consisted of QCB-type alumina.

Example 15

Flash-calcined gibbsite (Alcoa Cp-3) [15.9 g] was slurried in deionized water. The solids content of the resulting precursor mixture was about 12 wt % and the pH was about 9.7. To this mixture, 6.20 g of a 35.0% nitric acid solution were added under high-shear mixing. The pH of the resulting slurry was 2.15. Subsequently, 3.70 g of a 29.9% ammonium hydroxide solution were added until the pH was 4.98. The resulting slurry was homogenized and aged at 165° C. for two hours. Subsequently, the slurry was filtered, washed, and dried at 120° C. X-ray diffraction analysis indicated the product consisted of QCB-type alumina.

Example 16

Flash-calcined gibbsite (Alcoa Cp-3) [15.9 g] was slurried in deionized water. The solids content of the resulting precursor mixture was about 12 wt % and pH was about 9.7. To this mixture, 2.6 g of a 49.0% sulfuric acid solution were added under high-shear mixing. The pH of the resulting slurry was 2.15. Subsequently, 13.70 g of a 29.9% ammonium hydroxide solution were added until the pH was 9.54. The resulting slurry was homogenized and aged at 165° C. for two hours in an autoclave at autogenous pressure. Subsequently, the slurry was filtered, washed, and dried at 120° C. X-ray diffraction analysis indicated the product consisted of QCB-type alumina with a FWHH of 2.6° 2θ.

Example 17

Gibbsite (Huber Micral 916) [23.4 g] was slurried in deionized water. The solids content of the resulting precursor mixture was about 12 wt % and the pH was about 7. To this precursor mixture, 1.70 g of a 35.0% nitric acid solution were added and milled in a colloidal mill. The pH of the resulting slurry was 1.85. Subsequently, 1.00 g of a 29.9% ammonium hydroxide solution was added until the pH was 4.99. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina.

Example 18

Gibbsite (Huber Micral 916) [23.4 g] was slurried in deionized water. The solids content of the resulting precursor mixture was about 12 wt % and the pH was about 7. To this precursor mixture, 1.40 g of a 49.0% sulfuric acid solution were added and the resulting mixture was milled in a colloidal mill. The pH of the resulting slurry was 1.85. Subsequently, 3.40 g of a 29.9% ammonium hydroxide solution were added until the pH was 9.55. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina with a FWHH of 2.5° 2θ.

Example 19

Gibbsite (Huber Micral 916) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 2.30 g of a 35.0% nitric acid solution were added under high-shear mixing. The pH of the resulting slurry was 1.91. Subsequently, 1.60 g of a 29.9% ammonium hydroxide solution were added until the pH was 5.04. The resulting slurry was dispersed in a colloidal and aged at 185° C. for two hours in an autoclave at autogenous pressure. Subsequently, the slurry was filtered, washed, and dried at 120° C. X-ray diffraction analysis indicated the product consisted of QCB-type alumina.

Example 20

Gibbsite (Huber Micral 916) [16.4 g] and flash-calcined gibbsite (Alcoa Cp-3) [4.79 g] were slurried in deionized water in a weight ratio of 70 to 30. The solids content of the resulting precursor mixture was about 12 wt % and the pH was about 9.5. To this mixture, 2.10 g of a 49.0% sulfuric acid solution were added and added under high-shear mixing. The pH of the resulting, slurry was 1.91. Subsequently, 4.50 g of a 29.9% ammonium hydroxide solution were added until the pH was 9.65. The resulting slurry was dispersed in a colloidal mill and aged at 185° C. for two hours. Subsequently, the slurry was filtered, washed, and dried at 120 C. X-ray diffraction analysis indicated the product consisted of QCB-type alumina with a FWHH of 2.2° 2θ.

Example 21

Gibbsite (Huber Micral 916) [16.4 g] and Catapal A [6.25 g] were slurried in deionized water. The solids content of the resulting precursor mixture was about 12 wt % and the pH was between 6 and 7. To this mixture, 2.60 g of a 35.0% nitric acid solution were added under high-shear mixing. The pH of the resulting slurry was 1.84. Subsequently, 1.30 g of a 29.9% ammonium hydroxide solution were added until the pH was 4.96. The resulting slurry was dispersed in a colloidal mill and aged at 185° C. for two hours in an autoclave at autogenous pressure. Subsequently, the slurry was filtered, washed, and dried at 120° C. X-ray diffraction analysis indicated the product consisted of QCB-type alumina.

Example 22

Gibbsite (Huber Micral 916) [16.4 g] and Catapal A [6.25 g] were slurried in deionized-water. The solids content of the resulting precursor mixture was about 12 wt % and the pH was between 6 and 7. To this mixture, 2.10 g of a 49.0% sulfuric acid solution were added under high-shear mixing. The pH of the resulting slurry was 1.84. Subsequently, 6.70 g of a 29.9% ammonium hydroxide solution were added until the pH was 9.55. The resulting slurry was dispersed in a colloidal mill and aged at 185° C. for two hours in an autoclave at autogenous pressure. Subsequently, the slurry was filtered, washed, and dried at 120° C. X-ray diffraction analysis indicated the product consisted of QCB-type alumina with a FWHH of 2.9° 2θ.

Example 23

Gibbsite (Huber Micral 916) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 2.80 g of a 35.0% nitric acid solution were added under high-shear mixing. The pH of the resulting slurry was 1.83. To this mixture, 6.20 g of a 28.54% sodium silicate solution (6% $SiO_2$ based on total $Al_2O_3$) were added. The pH of the resulting slurry was 3.42. Subsequently, 0.50 g of a 29.9% ammonium hydroxide solution were added until the pH was 5.25. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina with a FWHH of 2.3° 2θ.

Example 24

Gibbsite (Huber Micral 916) [16.4 g] and flash-calcined gibbsite (Alcoa-Cp-3) [4.79 g] were slurried in deionized water. The solids content of the resulting precursor mixture was about 12 wt % and the pH was about 9.5. To this mixture, 2.80 g of a 35.0% nitric acid solution were added under high-shear mixing. The pH of the resulting slurry was 1.83. To this mixture, 6.20 g of a 28.54% sodium silicate solution (6% $SiO_2$ based on total $Al_2O_3$) were added. The pH of the resulting slurry was 3.42. Subsequently, 2.60 g of a 29.9% ammonium hydroxide solution were added until the pH was 9.54. The resulting slurry was homogenized and aged at 185° C. for two hours in, an autoclave at autogenous pressure. Subsequently, the slurry was filtered, washed, and dried at 120° C. X-ray diffraction analysis indicated the product consisted of QCB-type alumina.

Example 25

Gibbsite (Huber Micral 916) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 3.20 g of a 35.0% nitric acid solution were added under high-shear mixing. The pH of the resulting slurry was 1.81. To this mixture, 8.90 g of a 13.34% sodium phosphate solution (3.4% $P_2O_5$ based on total $Al_2O_3$) were added. The pH of the resulting slurry was 4.98. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina with a FWHH of 2.7° 2θ.

Example 26

Gibbsite (Huber Micral 916) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 3.20 g of a 35.0% nitric acid solution were added under high-shear mixing. The pH of the resulting slurry was 1.81. To this mixture, 8.90 g of a 13.34% sodium phosphate solution (3.4% $P_2O_5$ based on total $Al_2O_3$) were added. The pH of the resulting slurry was 4.98. Subsequently, 2.70 g of a 29.9% ammonium hydroxide solution were added until the pH was 9.50. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina.

Example 27

Gibbsite (Huber Micral 916) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 3.20 g of a 35.0% nitric acid solution were added under high-shear mixing. The pH of the resulting slurry was 1.55. To this mixture, 3.1 g of a 28.54% sodium silicate solution (3% $SiO_2$ based on total $Al_2O_3$) were added. The pH of the resulting slurry was 2.56. Finally, to this mixture, 6.8 g of a 13.34% sodium phosphate solution (2.6% $P_2O_5$ based on total $Al_2O_3$) were added, resulting in a pH of 4.99. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina with a FWHH of 2.6° 2θ.

Example 28

Gibbsite (Huber Micral 916) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 3.20 g of a 35.0% nitric acid solution were added under high-shear mixing. The pH of the resulting slurry was 1.55. To this mixture, 3.1 g of a 28.54% sodium silicate solution (3% SiO2 based on total Al2O3) were added. The pH of the resulting slurry was 2.56. Finally, to this mixture, 6.8 g of a 13.34% sodium phosphate solution (2.6% $P_2O_5$ based on total $Al_2O_3$) were added. The pH of the resulting slurry was 4.99. Subsequently, 3.3 g of a 29.9% ammonium hydroxide solution were added until the pH was 9.53. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina with a FWHH of 2.8° 2θ.

Example 29

Flash-calcined gibbsite (Alcoa Cp-3) [16.4 g] was slurried in deionized water. The solids content of the resulting precursor mixture was about 12 wt % and the pH was about 9.7. To this mixture, 23.0 g of a 14.90% sodium aluminate solution were added. The $Al_2O_3$ weight ratio resulting from flash-calcined to sodium aluminate was 85:15. The pH of the resulting slurry was 13.2. To this mixture, 41.4 g of a 35.0% nitric acid solution were added under high-shear mixing. The pH of the resulting slurry was 1.64. Subsequently, 4.5 g of a 29.9% ammonium hydroxide solution were added until the pH was 5.40. The resulting slurry was homogenized and aged at 165° C. for two hours in an autoclave at autogenous pressure. Subsequently, the slurry was filtered, washed, and dried at 120° C. X-ray diffraction analysis indicated the product consisted of QCB-type alumina.

Example 30

Flash-calcined gibbsite (Alcoa Cp-3) [16.4 g] was slurried in deionized water. The solids content of the resulting precursor mixture was about 12 wt % and the pH was about 9.7. To this mixture, 23.0 g of a 14.90% sodium aluminate solution were added. The $Al_2O_3$ weight ratio from flash-calcined and sodium aluminate was 85:15. The pH of the resulting slurry was 13.2. To this mixture, 50.5 g of a 49.0% sulfuric acid solution were added under high-shear mixing The pH of the resulting slurry was 1.64. Subsequently, 24.2 g of a 29.9% ammonium hydroxide solution were added until the pH was 9.56. The resulting slurry was homogenized and aged at 165° C. for two hours. Subsequently, the slurry was filtered, washed, and dried at 120° C. X-ray diffraction analysis indicated the product consisted of QCB-type alumina.

Example 31

Gibbsite (Huber Micral 916) [16.4 g] and flash-calcined gibbsite (Alcoa Cp-3) [4.79 g] were slurried in deionized water in a weight ratio of 70 to 30. The solids content of the resulting precursor mixture was about 12 wt % and the pH was about 9.5. To this mixture, 2.1 g of a 49.0% sulfuric acid solution were added under high-shear mixing. The pH of the resulting slurry was 1.91. Subsequently, 10.90 g of a 3.85% sodium hydroxide solution were added until the pH was 5.50. The resulting slurry was homogenized and aged at 185° C. for two hours. Subsequently, the slurry was filtered, washed, and dried at 120° C. X-ray diffraction analysis indicated the product consisted of QCB-type alumina.

Example 32

Gibbsite (Huber Micral 916) [16.4 g] and flash-calcined gibbsite (Alcoa Cp-3) [4.79 g] were slurried in deionized water in a weight ratio of 70 to 30. The solids content of the resulting precursor mixture was about 12 wt % and the pH was about 9.5. To this mixture, 2.70 g of a 49.0% sulfuric acid solution were added under high-shear mixing. The pH of the resulting slurry was 1.77. Subsequently, 2.80 g of a 29.9% ammonium hydroxide solution were added until the pH was 5.20. The resulting slurry was homogenized and aged at 185° C. for two hours. Subsequently, the slurry was filtered, washed, and dried at 120° C. X-ray diffraction analysis indicated the product consisted of QCB-type alumina.

Example 33

Gibbsite (Huber Micral 916) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 2.10 g of a 49.0% sulfuric acid solution were added under high-shear mixing. The pH of the resulting slurry was 1.88. Subsequently, 1.40 g of magnesium hydroxide were added until the pH was 6.30. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina with a FWHH of 2.5° 2θ.

Example 34

Gibbsite (Huber Micral 916) [16.4 g] and flash-calcined gibbsite (Alcoa Cp-3) [4.79 g] were slurried in deionized water in a weight ratio of 70 to 30. The solids content of the resulting precursor mixture was about 12 wt % and the pH was about 9.5. To this mixture, 43.90 g of a 50% acetic acid solution were added under high-shear mixing. The pH of the resulting slurry was 2.73. Subsequently, 29.60 g of a 3.85% sodium hydroxide solution were added until the pH was 5.10. The resulting slurry was homogenized and aged at 185° C. for two hours. Subsequently, the slurry was filtered, washed, and dried at 120° C. X-ray diffraction analysis indicated the product consisted of QCB-type alumina.

Example 35

Gibbsite (Huber Micral 916) [16.4 g] and flash-calcined gibbsite (Alcoa Cp-3) [4.79 g] were slurried in deionized water. The solids content of the resulting precursor r-mixture was about 12 wt % and the pH was about 9.5. To this mixture, 2.10 g of a 30.0% monoammonium hydrogen phosphate solution were added under high-shear mixing. The pH of the resulting slurry was 5.54. Subsequently, 2.36 g of a 10.4% tetra sodium pyrophosphate solution and 5.50 g of a 3.85% sodium hydroxide solution were added until the pH was 7.98. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina.

Example 36

Gibbsite (Huber Micral 916) [16.4 g] and flash-calcined gibbsite (Alcoa Cp-3) [4.79 g] were slurried in deionized water in a weight ratio of 70 to 30. The solids content of the resulting precursor mixture was about 12 wt % and the pH was about 9.5. To this mixture, 2.30 g of a 35.0% nitric acid solution were added under high-shear mixing. The pH of the resulting slurry was 1.91. Subsequently, 12.99 g of a 8.0% sodium phosphate solution (3.0% $P_2O_5$ based on the total $Al_2O_3$) were added until the pH was 9.04. The resulting slurry was homogenized and aged at 185° C. for two hours. Subsequently, the slurry was filtered, washed, and dried at 120° C. X-ray diffraction analysis indicated the product consisted of QCB-type alumina.

Example 37

Gibbsite (Huber Micral 916) [16.4 g] and flash-calcined gibbsite (Alcoa Cp-3) [4.79 g] were slurried in deionized water in a weight ratio of 70 to 30. The solids content of the resulting precursor mixture was about 12 wt % and the pH was about 9.5. To this mixture, 2.30 g of a 35.0% nitric acid solution were added under high-shear mixing. The pH of the resulting slurry was 1.91. Subsequently, 12.10 g of a 18.6% sodium metasilicate solution (3.6% $SiO_2$ based on total $Al_2O_3$) were added until the pH was 10.3. The resulting slurry was homogenized and aged at 185° C. for two hours. Subsequently the slurry was filtered, washed, and dried at 120° C. X-ray diffraction analysis indicated the product consisted of QCB-type alumina with a FWHH of 2.4° 2θ.

Example 38

Gibbsite (Huber Micral 916) [16.4 g] and flash-calcined gibbsite (Alcoa Cp-3) [4.79 g] were slurried in deionized water in a weight ratio of 70 to 30. The solids content of the resulting precursor mixture was about 12 wt % and the pH was about 9.5. To this mixture, 0.40 g of a 49.0% sulfuric acid solution was added under high-shear mixing. The pH of the resulting slurry was 3.97. Subsequently, 2.70 g of a 19.0% sodium metasilicate solution (0.9% based on total $Al_2O_3$) were added until the pH was 8.59. The resulting slurry was homogenized and aged at 185° C. for two hours. Subsequently, the slurry was filtered, washed, and dried at 120° C. X-ray diffraction analysis indicated the product consisted of QCB-type alumina.

Example 39

Gibbsite (Huber Micral 916) [16.4 g] and flash-calcined gibbsite (Alcoa Cp-3) [4.79 g] were slurried in deionized water in a weight ratio of 70 to 30. The solids content of the resulting precursor mixture was about 12 wt % and the pH was about 9.5. To this mixture, 0.40 g of a 49.0% sulfuric acid solution were added under high-shear mixing. The pH of the resulting slurry was 4.24. Subsequently, 1.30 g of a 19.0% sodium metasilicate solution (0.4% based on total $Al_2O_3$) and 1.90 g of a 3.85% sodium hydroxide solution were added until the pH was 8.75. The resulting slurry was homogenized and aged at 185° C. for two hours. Subsequently, the slurry was filtered, washed, and dried at 120° C. X-ray diffraction analysis indicated the product consisted of QCB-type alumina.

Example 40

Gibbsite (Huber Micral 9-16) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 0.30 g of a 49.0% sulfuric acid solution was added, under high-shear mixing. The pH of the resulting slurry was 5.15. Subsequently, 4.17 g of a 10.4% tetrasodium pyrophosphate solution (1.0% $P_2O_5$ based on total $Al_2O_3$) and 0.70 g of a 3.85% sodium hydroxide solution were added until the pH was 9.37. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina.

Example 41

Gibbsite (Huber Micral 916) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 0.30 g of a 49.0% sulfuric acid solution was added under high-shear mixing. The pH of the resulting slurry was 5.15. Subsequently, 2.00 g of a 19.0% sodium metasilicate solution (2.2% $SiO_2$ based on total $Al_2O_3$) and 4.17 g of a 10.4% tetrasodium pyrophosphate solution (1.0% $P_2O_5$ based on the total $Al_2O_3$) were added until the pH was 9.37. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina with a FWHH of 2.6° 2θ.

Example 42

Gibbsite (Huber Micral 916) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 0.30 g of a 49.0% sulfuric acid solution was added under high-shear mixing. The pH of the resulting slurry was 5.15. Subsequently, 3.75 g of a 14.9% sodium aluminate solution were added to increase the pH in the range of 10-11. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina.

Example 43

Gibbsite (Huber Micral 916) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 2.80 g of a 26.8% aluminium sulfate solution were added under high-shear mixing. The pH of the resulting slurry was 4.03. Subsequently, 5.00 g of a 19.0% sodium metasilicate solution resulting in a final pH of 9.1. The resulting slurry was homogenized and aged at 185° C. for two hours in an autoclave at autogenous pressure. Subsequently, the slurry was filtered, washed with dilute ammonium hydroxide solution, and dried at 120° C. X-ray diffraction analysis indicated the product consisted of QCB-type alumina.

Example 44

Gibbsite (Huber Micral 916) [16.4 g] and flash-calcined gibbsite (Alcoa Cp-3) [4.79 g] were slurried in deionized water in a weight ratio of 68.5 to 29.3. The solids content of the resulting precursor mixture was about 12 wt % and the pH was about 9.5. To this mixture, 2.80 g of a 26.8% aluminum sulfate solution (1.4% $Al_2O_3$ based on the total $Al_2O_3$) were added under high-shear mixing. The pH of the resulting slurry was 4.03. Subsequently, 1.50 g of a 14.9% sodium aluminate solution (0.8% $Al_2O_3$ based on the total $Al_2O_3$) were added, resulting in a final pH of 9.25. The resulting slurry was homogenized and aged at 185° C. for two hours. Subsequently, the slurry was filtered, washed with dilute ammonium hydroxide solution, and dried at 120° C. X-ray diffraction analysis indicated the product consisted of QCB-type alumina.

Example 45

Gibbsite (Huber Micral 916) [16.4 g] and flash-calcined gibbsite (Alcoa Cp-3) [4.79 g] were slurried in deionized water. The solids content of the resulting precursor mixture was about 12 wt % and the pH was about 9.5. To this mixture, 5.00 g of a 6.0% freshly-prepared polysilicic acid (2.0% $SiO_2$ based on the total $Al_2O_3$) were added under high-shear mixing. The pH of the resulting slurry was 1.9. Subsequently, 4.7 g of a 30.0% ammonium hydroxide were added, resulting in a final pH of 9.5. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina.

Comparative Example 46

Gibbsite (Huber Micral 916) [16.4 g] and flash-calcined gibbsite (Alcoa Cp-3). [4.79 g] were slurried in deionized water in a weight ratio of 70 to 30. The solids content of the resulting precursor mixture was about 12 wt % and the pH was about 9.5. After the slurry was high-shear mixed, the final pH was 9.5. The resulting slurry was homogenized and aged at 185° C. for two hours. Subsequently, the slurry was filtered, washed, and dried at 120° C. X-ray diffraction analysis indicated the product consisted of MCB-type alumina with a FWHH of 0.65° 2θ.

Example 47

Gibbsite (Huber Micral 916) [16.4 g] and flash-calcined gibbsite (Alcoa Cp-3) [4.79 g] were slurried in deionized water in a weight ratio of 70 to 30. The solids content of the resulting precursor mixture was about 12 wt % and the pH was about 9.5. To this mixture, 2.70 g of a 49.0% sulfuric acid solution were added under high-shear mixing. The pH of the resulting slurry was 1.77. Subsequently, 4.70 g of a 29.9% sodium hydroxide solution were added until the pH was 9.6. The resulting slurry was homogenized and aged at 185 C for two hours. Subsequently, the slurry was filtered, washed with dilute ammonium hydroxide solution, and dried at 120° C. X-ray diffraction analysis indicated the product consisted of QCB-type alumina.

Comparative Example 48

Gibbsite (Huber Micral 916) [16.4 g] and flash-calcined gibbsite (Alcoa Cp-3) [4.79 g] were slurried in deionized water. The solids content of the resulting precursor mixture was about 12 wt %. After the slurry was high-shear mixed, the final pH was 9.5. Subsequently, 0.3 g of a 29.9% sodium hydroxide solution was added until the pH was 11. The resulting slurry was homogenized and aged at 185° C. for two hours in an autoclave at autogenous pressure. Subsequently, the slurry was filtered, washed with dilute ammonium hydroxide solution, and dried at 120° C. X-ray diffraction analysis indicated the product consisted of MCB-type alumina with a FWHH of 0.60° 2θ.

Comparative Example 49

Flash-calcined gibbsite (Alcoa Cp-3) [15.9 g] was slurried in deionized water. The solids content of the resulting precursor mixture was about 12 wt %. The pH of the resulting slurry was 9.7. Subsequently, 0.35 g of a 29.9% sodium hydroxide solution was added until the pH was 11. The resulting slurry was homogenized and aged at 185° C. for two hours in an autoclave at autogenous pressure. Subsequently, the slurry was filtered, washed with dilute ammonium hydroxide solution, and dried at 120° C. X-ray diffraction analysis indicated the product consisted of MCB-type alumina with a FWHH of 0.70° 2θ.

Comparative Example 50

Flash-calcined gibbsite (Alcoa Cp-3) [15.9 g] was slurried in deionized water. The solids content of the resulting precursor mixture was about 12 wt % and the pH was about 9.7. To this mixture, 3.9 g of a 49.0% sulfuric acid solution were added under high-shear mixing. The pH of the resulting slurry was 1.5. The resulting slurry was homogenized and aged at 165° C. for two hours in an autoclave at autogenous pressure. Subsequently, the slurry was filtered, washed with dilute ammonium hydroxide solution, and dried at 120° C. X-ray diffraction analysis indicated that the product contained a small amount of poorly crystalline QCB-type alumina.

Example 51

Flash-calcined gibbsite (Alcoa Cp-3) [15.9 g] was slurried in deionized water. The solids content of the resulting-precursor mixture was about 12 wt % and the pH was bout 9.7. To this mixture, 21.9 g of a 15.0% zinc nitrate solution and 4.2 g of a 35.0% nitric acid solution were added under high-shear mixing. The pH of the resulting slurry was 2.2. Subsequently, 2.50 g of a 29.9% ammonium hydroxide solution were added until the pH was 5.50. The resulting slurry was, homogenized and aged at 185° C. for two hours in an autoclave at autogenous pressure. Subsequently, the slurry was filtered, washed, and dried at 120° C. X-ray diffraction analysis indicated the product consisted of QCB-type alumina.

Example 52

Flash-calcined gibbsite (Alcoa Cp-3) [15.9 g] was slurried in deionized water. The solids content of the resulting precursor mixture was about 12 wt % and the pH was about 9.7. To this mixture, 4.0 g of a 20.0% vanadyl sulfate solution and 5.2 g of a 49.0% sulfuric acid solution were added under high-shear mixing. The pH of the resulting slurry was 2.5. Subsequently, 3.0 g of a 29.9% ammonium hydroxide solution were added until the pH was 7.50. The resulting slurry was homogenized and aged at 185° C. for two hours in an autoclave at autogenous pressure. Subsequently, the slurry was filtered, washed, and dried at 120° C. X-ray diffraction analysis indicated the product consisted of QCB-type alumina.

Example 53

Flash-calcined gibbsite (Alcoa Cp-3) [15.9 g] was slurried in deionized water. The solids content of the resulting precursor mixture was about 12 wt % and the pH was about 9.7. To this mixture, 8.9 g of a 20.0% magnesium sulfate solution and 5.0 g of a 49.0% sulfuric acid solution were added under high-shear mixing. The pH of the resulting slurry was 2.3. Subsequently, 5.9 g of a 29.9% ammonium hydroxide solution were added until the pH was 8.0. The resulting slurry was homogenized and aged at 185° C. for two hours in an autoclave at autogenous pressure. Subsequently, the slurry was filtered, washed with dilute ammonium hydroxide solution, and dried at 120° C. X-ray diffraction analysis indicated the product consisted of QCB-type alumina.

Comparative Example 54

Flash-calcined gibbsite (Alcoa Cp-3) [32.0 g] was slurried in deionized water. The solids content of the resulting precursor mixture was about 12 wt % and the pH was about 9.7. To this mixture, 3.0 g of a 49.0% sulfuric acid solution were added under high-shear mixing. The pH of the resulting slurry was 3.6. The resulting slurry was divided into two portions. The first portion was aged at 165° C. for two hours, while the second portion was aged at 185° C. for one hour in an autoclave at autogenous pressure. After aging these slurries were filtered, washed with dilute ammonium hydroxide solution, and dried at 120° C. X-ray diffraction analysis indicated that these products contained substantial amounts of unconverted alumina and only a small amount of QCB-type alumina.

Example 55

Comparative Example 54 was repeated, except that after the addition of sulfuric acid that produced a pH of 3.6, 18.5 g of a 29.9% solution of ammonium hydroxide were added to increase the pH to about 8.5 with high-shear mixing. The resulting slurry was divided into two portions. The first portion was aged at 165° C. for two hours, while the second portion was aged at 185° C. for one hour in an autoclave at autogenous pressure. After aging these slurries were filtered, washed with dilute ammonium hydroxide solution, and dried at 120° C. X-ray diffraction analysis indicated that both products were QCB-type alumina.

Comparative Example 56

Flash-calcined gibbsite (Alcoa Cp-3) [15.9 g] was slurried in deionized water. The solids content of the resulting precursor mixture was about 12 wt %. After the slurry was high-shear mixed, the final pH was 9.7. The resulting slurry was homogenized and aged at 185° C. for two hours in an autoclave at autogenous pressure. Subsequently, the slurry was filtered, washed, and dried at 120° C. X-ray diffraction analysis indicated the product consisted of MCB-type alumina with a FWHH of 1.2° 2θ.

Example 57

Flash-calcined gibbsite (Alcoa Cp-3) [32.0 g] was slurried in deionized water. The solids-content of the resulting precursor mixture was about 12 wt % and the pH was about 9.7. To this mixture, 9.40 g of a 49.0% sulfuric acid solution were added under high-shear mixing. The pH of the resulting slurry was about 1.2. Subsequently, 23.8 g of a 29.9% sodium hydroxide solution were added with high-shear mixing, resulting in a final pH of about 9.8.

The resulting slurry was divided into two portions. The first portion was aged at 165° C. for two hours, while the second portion was aged at 185° C. for one hour in an autoclave at autogenous pressure. After aging these slurries were filtered, washed with dilute ammonium hydroxide solution, and dried at 120° C. X-ray diffraction analysis indicated that both products were QCB-type alumina.

Comparative Example 58

Gibbsite (Huber Micral 916) [23.4 g] was slurried in deionized water. The solids content of the resulting precursor mixture was about 12 wt % and the pH was about 7. To this precursor mixture, a sodium hydroxide solution was added under high shear mixing until the pH was 12. The resulting slurry was homogenized and aged at 185° C. for two hours in an autoclave at autogenous pressure. Subsequently, the slurry was filtered, washed, and dried at 120° C. X-ray diffraction analysis indicated the product consisted of MCB-type alumina with a FWHH of 0.54° 2θ.

Comparative Example 59

Gibbsite (Huber Micral 916) [16.4 g] and Catapal A [6.25 g] were slurried in deionized water. The solids content of the resulting precursor mixture was about 12 wt % and the pH was between 6 and 7. To this mixture, a sodium hydroxide solution were added until the pH was 11. Meanwhile, the slurry was milled. The resulting slurry was dispersed in a colloidal mill and aged at 185° C. for two hours in an autoclave at autogenous pressure. Subsequently, the slurry was filtered, washed; and dried at 120° C. X-ray diffraction analysis indicated the product consisted of MCB-type alumina with a FWHH of 0.58° 2θ.

The invention claimed is:
1. Process for the preparation of a quasi-crystalline boehmite comprising the
steps of:
a) preparing an aqueous precursor mixture comprising a water-insoluble aluminium source,
b) decreasing the pH of the precursor mixture of step a) by at least 2 units,
c) increasing the pH of the mixture of step b) by at least 2 units, such that the pH of the mixture is at least 10, and
d) aging the mixture of step c) under hydrothermal conditions to form the quasi-crystalline boehmite.
2. A process according to claim 1 wherein the pH in step b) is decreased to a value below 7.
3. A process according to claim 2 wherein the pH in step b) is decreased to a value below 5.
4. A process according to claim 3 wherein the pH in step b) is decreased to a value below 3.
5. A process according to claim 1 wherein the water-insoluble aluminium source is selected from the group consisting of aluminium trihydrate, thermally treated aluminium trihydrate, aluminium sol, aluminium gel, and mixtures thereof.
6. A process according to claim 5 wherein the water-insoluble aluminium source is milled, either prior to its addition to the precursor mixture or when present in the precursor mixture.
7. A process according to claim 1 further comprising shaping the formed quasi-crystalline boehmite into shaped bodies.
8. A process according to claim 1 wherein additives are added either before or during step d).
9. A process according to claim 1 wherein the process is conducted in a continuous mode in one or more vessels.
10. A process according to claim 9 wherein the process is conducted in at least two vessels.
11. A process according to claim 9 wherein the total average residence time in all vessels together is between 20 and 120 minutes.
12. A quasi-crystalline boehmite obtainable by the process of claim 1.
13. A quasi-crystalline boehmite according to claim 12 having a Z-average submicron particle size, as measured with quasi-electron light scattering, of less than 500 nm.
14. A quasi-crystalline boehmite according to claim 13 wherein the Z-average submicron particle size is less than 300 nm.
15. A quasi-crystalline boehmite according to claim 14 wherein the Z-average submicron particle size is less than 200 nm.
16. A quasi-crystalline boehmite according to claim 15 wherein the Z-average submicron particle size is less than 100 nm.

* * * * *